(12) United States Patent
Luick

(10) Patent No.: US 6,922,714 B2
(45) Date of Patent: Jul. 26, 2005

(54) FLOATING POINT UNIT POWER REDUCTION SCHEME

(75) Inventor: David A. Luick, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 630 days.

(21) Appl. No.: 10/143,366

(22) Filed: May 9, 2002

(65) Prior Publication Data

US 2003/0212726 A1 Nov. 13, 2003

(51) Int. Cl.[7] .................................................. G06F 7/44
(52) U.S. Cl. ....................................................... 708/503
(58) Field of Search ................................. 708/503, 495

(56) References Cited

U.S. PATENT DOCUMENTS 5,923,871 A * 7/1999 Gorshtein et al. .......... 712/221

6,487,575 B1 * 11/2002 Oberman ..................... 708/504

* cited by examiner

Primary Examiner—Tan V. Mai
(74) Attorney, Agent, or Firm—Bockhop & Associates LLC

(57) ABSTRACT

A system and method for reducing the power consumption of a floating point unit of a processor wherein the processor iteratively performs floating point calculations based upon one or more input operands. The exponential value of a floating point is precalculated within an iterative loop through a superscalar instruction buffer resident on the processor that holds at least 3 iterations of the largest single cycle iteration possible on the processor, and the precalculated exponent value is used to generate a bit mask that enables a minimal number of fractional data flow bits. Alternately, a look-ahead can be used to obtain the exponent value from at least two subsequent iterations of the loop.

13 Claims, 2 Drawing Sheets

FLOATING POINT UNIT POWER REDUCTION SCHEME

BACKGROUND OF THE INVENTION

1. Field of the Invention

The present invention generally relates to computer systems and processors. More particularly, the present invention relates to a system and method for reducing the power consumed in a floating point unit of a processor through minimizing the bits participating in the floating point calculations performed in a loop.

2. Description of the Prior Art

Power conservation is increasingly becoming a concern in both computer systems and processor design. The components of the processor, such as the logic gate transistors, buses and registers, generate heat from their electrical conductance in computer operations. The dramatic increase of chip components on a processor has exacerbated the problems associated with heat generation on the processor, as more components yield more heat during operation.

There have been several attempts in the prior art to alleviate processor power consumption problems. One method is to simply have the processor operate at lower power levels and clock frequency. Another solution has been to create modes within the processor that deactivate system power to components in a computer system when not in use. The processors include power-down circuitry that controls the power delivered to functional units of the processor, and the individual units of the processors have the power cut to them when it is determined that the unit is not necessary during the current operational cycle. However, this system adds to manufacturing costs of the processor, and creates significant overhead in activating and deactivating the units of the processor to affect overall performance of the processor.

Furthermore, in specific computer programs, a large iterative sequence can reuse the same series of components such that the components can become overheated and damaged from execution of the iterative program. The constant use of a particular series of processor components is acute in scientific computing that utilizes tight loop computing, such as a DAXPY floating point multiply add loop. In a prior art 64-bit Floating Point Multiply Adder (FPMADD) shown in FIG. 1, the utilization of the FPMADD approaches 100% since the entire FPMADD unit is used each cycle. At very high clock frequencies, and especially when dynamic logic in employed, the power generated by a 64-bit FPMADD unit will be very high, possibly 3 to 5 times that of the floating point unit and the power density of the multiply add unit can approach 3 to 5 times the maximum allowable of about 1 Watt/mm2.

One feature provided in state of the art processors is the availability of floating point operations. In early designs, because of processor design complexity, such features were provided via a separate co-processor. In modern processors, such floating-point functionality has been provided in the main processor in a floating point unit, and most modern processors clock the floating point circuitry, even though no floating point operations are currently executed, or floating point registers used. The floating point unit and processor are actuated by micro-code instructions that direct the loading and storing of floating point calculations.

Furthermore, most modern processors implement floating point instructions in hardware wherein a floating point instruction often requires multiple cycles of execution, and therefore a pipeline structure can be implemented to allow over-lapped execution of particularly the floating point instructions. In such pipelined implementation, floating point instructions can be accepted every cycle to produce a result every cycle. And any miscalculations or blockages in the pipelined instructions create "stalls" which in turn decrease the throughput of the pipeline and lower the performance of the processor. During the floating point computation, it is often necessary to store away intermediate results. This is done through the use of a "floating point store" instruction that stores the value in a specified floating point register to a specified storage address. In a microarchitecture that has in-order single instruction issue and completion, it is desirable to execute the store instruction in the pipeline along with the other floating point instructions to simplify control and minimize usage of chip components.

Pipelining floating point store instructions, however, presents several problems. A floating point store instruction may only require one cycle of execution. And because executing floating point stores in the same pipeline with other floating point arithmetic instructions increases the latency of the store, the throughput of a pipeline is threatened by the occurrence of stall cycles. It is thus desirable to minimize the occurrence of stall cycles within the floating point pipeline. One source of stall cycles occurs when an instruction is data dependent on a previous instruction in the pipeline. Traditionally, the instruction is stalled at the top of the pipeline until the data can be effectively wrapped from the bottom of the pipeline into the input register, but stalling the instruction at the top of the pipeline blocks other instructions from entering the pipeline.

Another problem with pipelining occurs with floating point store instructions that are executed in dedicated load/store execution units. The control sequencing of dispatching and completing from an additional floating point instruction load/store unit is complex with additional read ports to the floating point register array required. In order to eliminate stall cycles using a separate load/store unit, data forwarding paths are required that forward between the floating point execution unit to the load/store unit. These paths are long and limit the cycle time of the processor, and require additional chip components and chip area for implementation.

It would therefore be advantageous to provide a system and method that can reduce the power consumed in a tight loop of floating point calculations though propagation of data that minimizes the component usage during successive iterations. Such system and method should be robust and not require significant overhead in processor manufacture or operation. Nor should the system and method unnecessarily operate the circuitry of processor or co-processor in assisting the floating point unit in the iterative calculations. It is thus to the provision of such a system and method that the present invention is primarily directed.

SUMMARY OF THE INVENTION

The present invention is a system and method for reducing the power consumption of a floating point unit of a processor wherein the processor iteratively performs floating point calculations based upon one or more input operands. The exponential value of floating point calculation is either guessed or obtained with a look-ahead within an iterative loop, through preferably either a look-ahead floating point multiply adder including at least a partial bit mask resident in the floating point unit, or the use of a superscalar instruction buffer resident on the processor that holds at least 3 iterations of the largest single cycle iteration possible on the processor.

In one embodiment, the system for reducing the power consumption of a floating point unit of a processor includes a processor that selectively and iteratively performs floating point calculations based upon one or more input operands, and a look ahead floating point multiply adder is resident in the floating point unit. Upon at least a first iteration of a floating point calculation, the floating point multiply adder masks a portion of the bits from the source operands and assumes exponential value for successive iterations of the iterating floating point calculations. In this manner, the full general case calculation of the fractional value in each iteration of the tight loop is not required, which reduces the amount of power consumed as the floating point components do not have to calculate and propagate general case fractional value. Preferably, the floating point multiply adder has ½ of the multiply array bits and ⅓ of the adder bits propagated, and the exponential value of one of the source operands is assumed in each successive iteration of the floating point calculations within the tight loop. In the general case, an unknown exponent sum or difference is computed in parallel with the multiply-add of the fraction itself.

In this embodiment, it is possible to make an erroneous assumption of exponent value in a successive iteration, and therefore, a check is made to determine that the assumption of exponential value based upon the propagated exponent value is correct. If current floating point exponent value calculation does not correspond to the assumed exponent value, the floating point unit stalls the propagation of the exponent values and upon receiving the correct exponent value from the current calculation, re-executes the fraction computation.

In another embodiment, the system for reducing the power consumption of a floating point unit of a processor includes a superscalar instruction buffer and look-ahead resident on the processor, where the instruction buffer holds instructions and floating point calculations and is sufficiently large to hold at least 3 iterations of the largest single cycle iteration possible on the processor. This embodiment includes a floating point look-ahead selector resident in the floating point unit that looks ahead in the instruction buffer at least two subsequent iterations (typically 10 instructions) and begins calculation of the exponent result of the multiply-add at least two cycles early. The instruction buffer preferably pipelines two iterations of floating point calculations before obtaining the exponent value, and the floating point look ahead selector likewise prefetches the stored instructions in the instruction buffer from two subsequent iterations.

The method of the present invention for reducing the power consumption of a floating point unit of a processor that selectively and iteratively performs floating point calculations based upon one or more input operands includes the steps of performing a first iteration of a loop wherein a floating point calculation is made in the floating point unit based upon one or more input operands, propagating the exponent value based upon the one or more input operands, and performing at least a second iteration of the loop and making a floating point calculation assuming exponent value based upon the propagated exponent value. The method further preferably includes the steps of determining if the assumption of exponential value is incorrect; and if the assumed exponential value is incorrect, placing the correct exponential value into at least the second iteration of the loop prior to making a floating point calculation. These steps allow that the assumed value is incorrect, and thus stall further propagation of the incorrect value.

If the system includes a look-ahead and superscalar instruction buffer, then the step of assuming the exponent value based upon the one or more input operands is obtaining the exponent value with the look-ahead in the instruction buffer. This embodiment also preferably includes the steps of performing a second iteration of a loop wherein a floating point calculation is made in the floating point unit based upon one or more input operands, the look-ahead selector obtaining the exponent value from a second subsequent iteration. These steps allow the pipeline to be primed with at least two instructions before obtaining the exponent value to therefore ensure correct value and remove the need for stalling of the pipeline.

It is the therefore the primary object of the present invention to provide a system and method that addresses the problem of floating point unit power consumption during the tight loops encountered in scientific computing. The invention reduces the power consumed by the floating point unit executing the tight loop though propagation of exponent value from the input operands of a previous iteration. The system and method does not require significant overhead in processor manufacture or operation as it can use simple chip components or an additional hardware or software buffer to propagate exponent value.

Other objects, features, and advantages of the present invention will become apparent after review of the hereinafter set forth Brief Description of the Drawings, Detailed Description of the Invention, and the Claims.

DETAILED DESCRIPTION OF THE INVENTION

Figure 1:
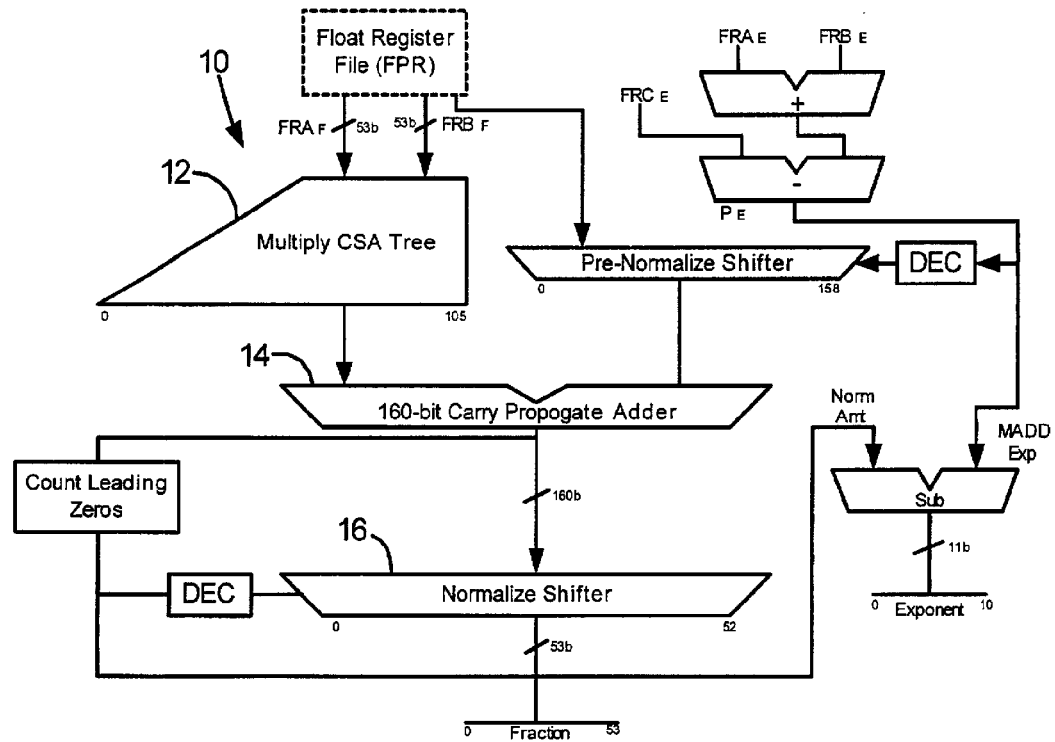
FIG. 1 is a block diagram of a prior art 64-bit floating point multiply adder.

The present invention is particularly adept at minimizing floating point unit (FPU) utilization in the tight inner loop class of problem encountered in the scientific computing domain. An example of such a problem is a DAXPY Loop in which the execution group is comprised of the instructions: LFDU; LFDU; MADD; STU; BC. That series of instructions thus iterates from BC→LFDU'.

The tight loop problem represents a structured and iterative problem whose repetitive nature can be exploited to save significant chip power. The basic underlying observation is that the large bulk of loop code becomes stride 1 at execution, or in other words, each successive iteration of the loop is with the next sequential double-word (64 b) data element. For physical modeling problems and other scientific applications, the magnitude of adjacent elements being calculated is highly correlated whereby adjacent or near adjacent elements on a modeling grid will almost always have values within a factor of 2 or 4 within a given inner loop iteration. Such is also true for graphics-intensive video apps, polynomial approximation, simulated annealing, and many other scientific and engineering workloads.

With reference to the prior art 64-bit FP multiply adder 10, the floating point is comprised of a sign bit, 12 exponent value bits, and 52 bits to indicate the fraction. The 106-bit multiply product must be formed along with a 160-bit adder 14 to handle the general case where the operand to be added to the product, FRC, must be shifted left or right up to 52 bits to align it with the product of FRA×FRB. The 160-bit result must then be renormalized in a 160-bit shifter 16 and potentially rounded in a 53-bit rounder (increment) stage if desired. The exponents of FRA and FRB are added to produce the exponent of the product PE and the exponent of FRC is subtracted from PE to form the exponent of the sum and to indicate how many bits to shift FRCF left or right to make the exponents of FRC and the product (FRA×FRB) equal before addition.

The intermediate values of the result exponent values (the exponent values of the product, the sum, and the normalize), then it is known within 1 bit which 53 bits of the multiplier 12, adder 14, and normalizer 16 will actually be kept and used in the next respective stage and final result. This particular case (limited to 53 or 54 bits of result) assumes truncation (round to zero) mode, and round to nearest requires some additional least significant bits. Thus, only performing the exponent 11-bit arithmetic indicates to the hardware fraction units which bits of the 53 should be clocked/enabled for the given input data (noting that only FRA is a variable for the inner loop of DAXPY).

Figure 2:
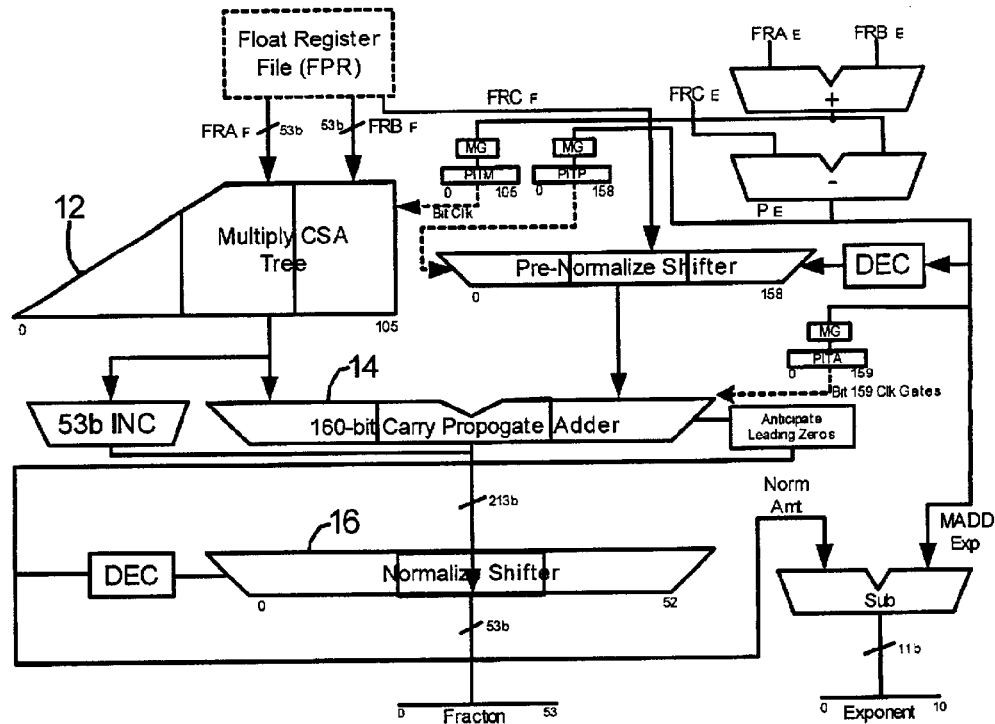
FIG. 2 is a block diagram of a 64-bit floating point multiply adder wherein shaded areas in fraction unit indicate that a fraction of bits can be used to produce an accurate iteration.

FIG. 2 accordingly illustrates the basic 64-bit multiply adder having the shaded areas of each fraction unit indicate, for a particular FRA example value, the fraction of bits of that unit that must be clocked/enabled to produce a complete result with all the bits actually needed. FIG. 2 therefore illustrates that a hardware-generated mask field, called a Power Inhibit Template (PIT) field, can be generated for each portion of the relatively wide fraction units data flow through only looking at the 11-bit exponent values for their respective results. However, these exponents from the FP register file are not available soon enough to do exponent arithmetic to clock inhibit/degate the fraction data flow units. To take advantage of the exponent propagation and degate the appropriate units, the exponents need to be available at the beginning of the FP issue/ibus stage, which is 2 cycles before the FP register file operand reads are latched.

Figure 3:
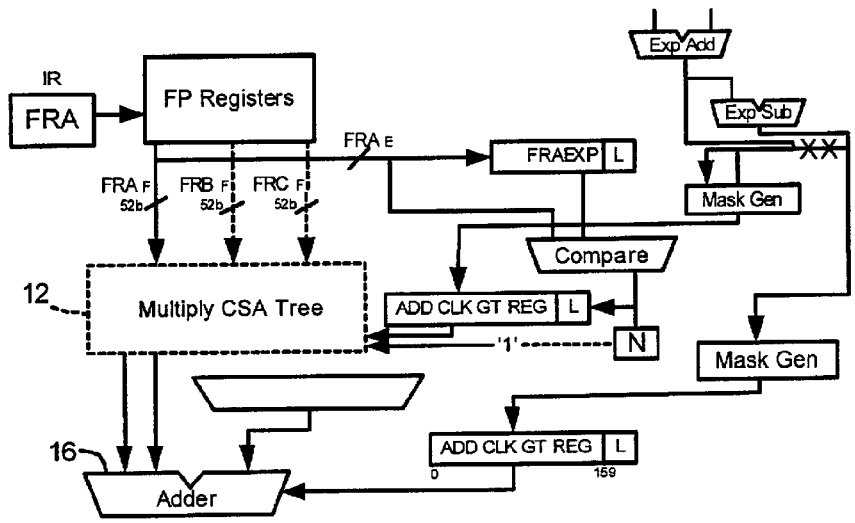
FIG. 3 is a block diagram of a floating point multiply adder that propagates the value of the exponent of FRA of N iteration to be assumed as the exponent in the N+1 iteration.

In one embodiment of the system of the present invention, which is shown in FIG. 3, a previous iteration of the loop is used to propagate values of the exponents for the three source operands for the MADD; FRA, FRB, and FRC. The system uses a generalized floating point multiply adder which consists of a 53 b×53 b=106 b multiply array and a 160+bit carry propagate adder for loop cases where only the ½ of the multiply array and the ⅓ of the adder bits (the bits that are actually kept) are clocked/enabled for that particular iteration of the loop. For DAXPY, and most scientific tight inner loops, two of the three source registers are constant over the inner loop. Relying on the relative closeness of values of adjacent elements, the exponent of adjacent stride 1 elements are most likely the same, or within one or two bits of true. Since only FRA is variable, the system assumes FRA is within a factor of 4 from its predecessor element.

Thus, the current FP MADD operation assumes its exponent is the same as a previous iteration (but within a given number of elements, such as 10) for the purposes of generating the PIT masks for power/clock gating. Two extra bits on each side of the 53-bit fraction value are also clocked/enabled to allow for a factor of 4 variation in value between the previous guess element and the current element.

However, because the system is assuming that the propagated exponent value is correct, it must compare the propagated value with the current actual value to ensure that an error has not occurred. The current iteration of the loop consequently fully powers the actual current exponent arithmetic which actually generates the always correct exponents and controls the FP MADD execution. The actual exponent value calculated for each fraction unit must agree within +1 bit of the guess exponent value or a mispredict is flagged requiring a stall and full re-execution of the operation using the correct exponent values.

In operation, the floating point multiply adder preferably propagates the exponent value based upon at least a first iteration of the loop, and successive iterations of the iterating floating point calculations assume exponent value based upon the propagated exponent value. The floating point multiply adder is comprised of a multiply array 14 and an adder 16, such as common in extant components. The template mask register allows the degating of the relevant bits per clock cycle. Each template mask register has as many bits in it as does the functional unit result that it controls, one clock gate/control mask bit per result bit so that only the relevant bits of the 53 bits of that unit are clocked/enabled and the larger number of remaining bits (½ to ¾) of the total are not clocked and/or are degated so as not to dissipate power from conductance. For example, if the multiply CSA array 12 and the adder 14 plus shifters are equal in power consumption (½ of fraction power), then the average power savings is about ½ in the multiplier 12, and ⅔ in the adder/shifters, or about a 7/12 savings or 58%. However, the exponent power remains the same at approximately 11 b/64 b×0.5X area/bit≈8% total. In also assuming truncation/round to zero or a limited (8-bit) rounder, the total FP MADD without FRF power is roughly cut in half.

Figure 4:
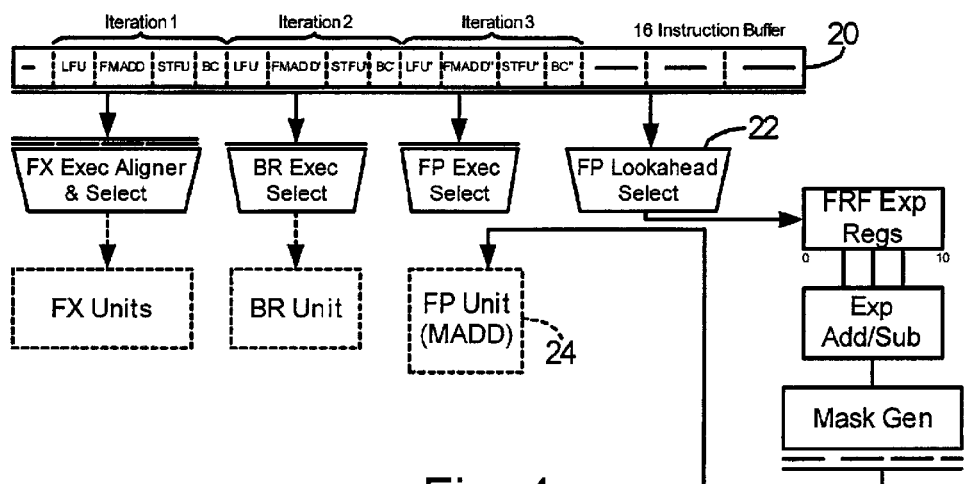
FIG. 4 is a block diagram of an instruction buffer that contains at least 3 full iterations of the loop and propagates the exponent value from the N+2 iteration to the N iteration of the floating point calculation.

Another embodiment of the present invention is shown in FIG. 4, which utilizes a look-ahead in a superscalar instruction buffer resident on the processor to avoid an exponent guess scheme and any possible stalls due to a wrong guess. In FIG. 4, a ⅚ issue in-order superscalar core 20 is used with multiple load/store units to allow one cycle per loop iteration for most FP engineering and scientific loop cases. The in-order machine assumes that the compiled code has either unrolled the loop three times or more, or the software has unrolled the loop, or both, to allow stall-less operation of a multicycle FP MADD pipe and multicycle load pipe.

The instruction buffer is implemented to be large enough to hold at least three iterations for the largest single cycle iteration possible, which is no more than 5issue (4FX+1 FP), so that the I-buffer contains at least 15 instructions and likely presumes an unaligned (instruction) I-fetch capability to eliminate boundary alignment problems. The instruction buffer 20 in FIG. 4 holds 16 instructions to insure storage of at least 3 iterations of the loop. When executing from the instruction buffer 20, each group of functional units (FX, FP, BR) selects the next instructions from the current execution group of 1–6 instructions based on a partial opcode/flag decode.

An example of a typical unrolled FMADD loop is: LFU; FMADD; STU; BC; LFU'; FMADD'; STU'; BC'; LFU";

FMADD'''; . . . By implementing a hardware branch target prefetch, the instruction buffer 20 always contains the four instructions (in this example) of the next next loop iteration, or FPMADD'''→STU.

The second embodiment uses a 4th instruction selector called the FPU lookahead selector 22, which always points to and selects the FP (MADD) instruction from the next next iteration (i.e., where next FP instr adr=current FP instr adr +8). This next FP MADD instruction then begins a minimal partial execution starting with the float register file read accesses of the exponents for FRA, FRB, and FRC and then completes the 11-bit exponent arithmetic addition for the multiply array and encodes a 106-bit fraction execution mask (PIT) for the multiplier, and allows a third cycle for propagation of the clock gates/inhibit signals. Accordingly, three additional 11-bit read ports might be required for the FP unit 24. These read ports can be formed without extra hardware costs by simply splitting the float register file into two independent portions of 53 bits and 11 bits respectively, representing the fraction and exponent portions of the register. The 11-bit exponent portion can then be independently accessed earlier than the 53 bit fraction portion.

The remaining mask fields are sequentially generated on the next and next next cycles, two cycles ahead of their normal generation, to allow sufficient time for clock gating. This scheme always produces the correct answer for a MADD operation and thus does not have the necessity of creating a FPMADD stall and retry when incorrect.

This implementation preferably has two stages of software pipelining done at the beginning of loop execution, and immediately before the Inner FPMADD loop. The sequence of execution is thus: MADD1; MADD2; L MADD1 ST BC'; L MADD2 ST BC' . . . and then the prefetching occurs where MADD4→MADD1. With this scheme, the hardware has seen the first FPMADD instruction for two cycles before the loop begins, which allows the lookahead exponent logic to start in time and use the normal existing exponent logic to generate the exponent additions/subtractions two cycles early, which is sufficient time to allow for clock gating of the fraction results.

The inventive system therefore provides a method for reducing the power consumption of a floating point unit of a processor that selectively and iteratively performs floating point calculations based upon one or more input operands, such as FRA and FRB, with the method including the steps of performing a first iteration of a loop wherein a floating point calculation is made in the floating point unit based upon one or more input operands, such as the instruction sequence LFU; FMADD; STU; BC, propagating the exponent value based upon the one or more input operands, such as FMADD''' to STU, and performing at least a second iteration of the loop and making a floating point calculation assuming exponent value based upon the propagated exponent values.

If the system is embodied with a floating point multiply adder with a power inhibit template shown in FIG. 3, the step of assuming the exponent value based upon the one or more input operands is assuming the exponential value with a floating point multiply adder in the first iteration, such as FRA. Because this embodiment assumes exponent value, it requires the steps of determining if the assumption of exponent value based upon the propagated exponent value is incorrect, and if the propagated exponential value is incorrect, placing the correct exponent value into at least the second iteration of the loop prior to making a floating point calculation to correct the erroneous guess.

If the system is embodied with an instruction buffer 20 containing an unrolled loop, a look-ahead in the instruction buffer 20 occurs such that the exponent value of the FMADD result can be determined 2 cycles (two iterations) early to allow sufficient time for unneeded fraction data flow bits to be clock degated. In such manner, the mask fields are sequentially generated on the next and next-next cycles to allow sufficient time for clock gating, and checking for a erroneous assumed exponent value is unnecessary.

While there has been shown a preferred embodiment of the present invention, it is to be understood that certain changes may be made in the forms and arrangement of the elements and steps of the method without departing from the underlying spirit and scope of the invention as is set forth in the claims.

What is claimed is:

1. A system for reducing the power consumption of a floating point unit of a processor, comprising:
    a processor that selectively and iteratively performs floating point calculations based upon one or more input operands;
    a floating point multiply adder resident in the floating point unit, the floating point multiply adder comprised of a multiply array and an adder, and including at least a partial bit mask; and
    wherein upon at least a first iteration of a floating point calculation, the floating point multiply adder assuming the exponent value based upon the one or more input operands, and successive iterations of floating point calculations utilize the assumed exponent value.

2. The system of claim 1, wherein, upon determining that the assumption of exponent value based upon the propagated exponent value is incorrect, the floating point unit stalling the propagation of the incorrect exponent values and receiving the correct exponent value.

3. The system of claim 1, wherein the partial bit mask of the floating point multiply adder propagates ½ of the multiply array bits and ⅓ of the adder bits.

4. The system of claim 1, wherein the exponential value of one of the source operands is propagated in each successive iteration of the floating point calculations.

5. A system for reducing the power consumption of a floating point unit of a processor, comprising:
    a processor that selectively and iteratively performs floating point calculations based upon one or more input operands;
    a superscalar instruction buffer resident on the processor, the instruction buffer holding instructions and floating point calculations, and at least sufficiently large to hold 3 iterations of the largest single cycle iteration possible on the processor; and
    a floating point look ahead selector resident in the floating point unit, the floating point look ahead selector selecting the exponent value from a subsequent iteration within the instruction buffer; and
    wherein successive iterations of floating point calculations assume exponent value based upon the selected exponent value of the look-ahead selector.

6. The system of claim 5, wherein the instruction buffer pipelines two iterations of floating point calculations before selecting the exponent value.

7. The system of claim 5, wherein floating point look ahead selector prefetches the stored instructions in the instruction buffer from two previous iterations.

8. The system of claim 5, wherein the instruction buffer holds at least 16 instructions.

9. A method for reducing the power consumption of a floating point unit of a processor that selectively and iteratively performs floating point calculations based upon one or more input operands, the method comprising the steps of:

performing a first iteration of a loop wherein a floating point calculation is made in the floating point unit based upon one or more input operands;

assuming the exponent value based upon the one or more input operands, and performing at least a second iteration of the loop and making a floating point calculation assuming exponent value based upon the assumed exponent values.

10. The method of claim 9, further including the steps of:

determining if the assumption of exponent value is incorrect; and if the assumed exponent value is incorrect, placing the correct exponent value into at least the second iteration of the loop prior to making a floating point calculation.

11. The method of claim 9, wherein the step of assuming the exponent value based upon the one or more input operands is assuming the exponent value with a floating point multiply adder in the first iteration.

12. The method of claim 9, wherein the step of assuming the exponential value based upon the one or more input operands is assuming the exponent value with a look-ahead selector and a superscalar instruction buffer resident on the processor, the instruction buffer holding instructions and floating point calculations, and at least sufficiently large to hold 3 iterations of the largest single cycle iteration possible on the processor, and the look-ahead selector obtaining the exponent value from a subsequent iteration of the loop.

13. The method of claim 12, further comprising the step of performing a second iteration of a loop wherein a floating point calculation is made in the floating point unit based upon one or more input operands, the look-ahead selection obtaining the exponent value from a second subsequent iteration of the loop.

* * * * *